April 14, 1931.  E. C. HORST  1,800,632
METHOD OF PREPARING HOP EXTRACT AND PRODUCTS CONTAINING HOP EXTRACT
Filed May 3, 1927
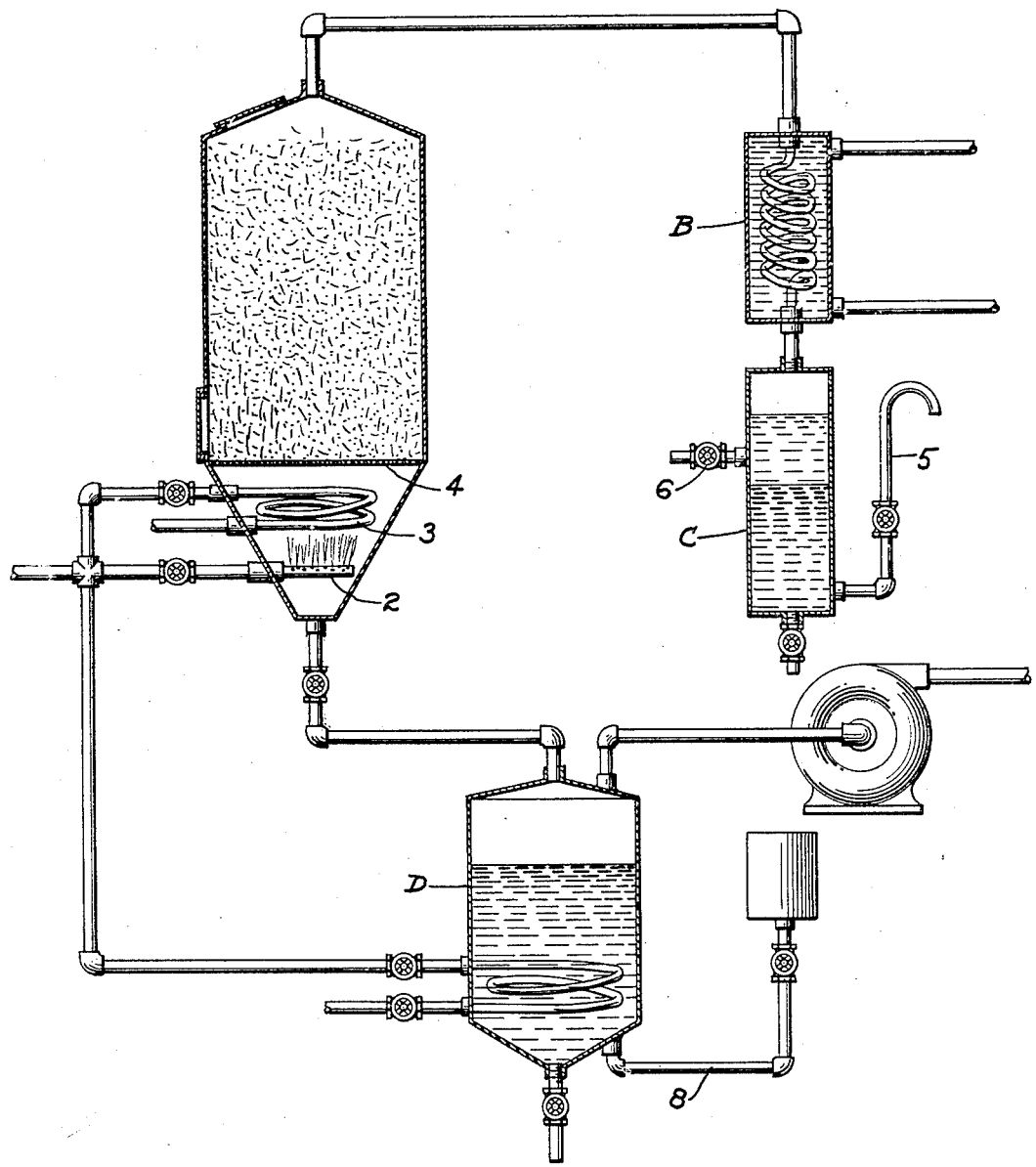
INVENTORS.
E. C. HORST.
BY Townsend, Loftus & Abbett
ATTORNEYS.

Patented Apr. 14, 1931

1,800,632

UNITED STATES PATENT OFFICE

EMIL C. HORST, OF SAN FRANCISCO, CALIFORNIA

METHOD OF PREPARING HOP EXTRACT AND PRODUCTS CONTAINING HOP EXTRACT

Application filed May 3, 1927. Serial No. 188,450.

This invention relates to a method of preparing hop extract and the product obtained, the object being to obtain a hop extract containing all the desired constituents of hops of value for the manufacture of non-prohibited cereal beverages and other non-prohibited products.

The method briefly stated consists first in extracting the volatile matter or oil from the fresh or dried hops. Secondly to extract the bitter constituents consisting of soft resins, the tannins, the coloring matter and the foam producing constituents, and third to combine the volatile oil of the hops and the extract to obtain a product containing all the constituents of hops required for the brewing of cereal beverages.

A form of apparatus suitable for the operation of the method is diagrammatically illustrated in the accompanying drawing, in which A indicates a suitable form of retort, B a condenser, C a receiver and D a vacuum pan. The retort is provided with a live steam inlet pipe 2, a heating coil 3 and a perforated bottom section 4 which supports the hops and acts as a strainer when placed within the retort, as will be hereinafter described. For the purpose of clearly describing the operation of the method and the proportions of the different ingredients employed, it will be noted that if it is desired to treat nine hundred pounds of hops, the hops are placed in the retort A on top of the perforated bottom section 4 and the retort closed. The live steam is turned on and enters through the perforated pipe 2. It passes upwardly through the perforated bottom and the hops and the distillation and liberation of the volatile matter contained therein starts. The steam, together with the volatile matter liberated enters the condenser B where they are condensed, the condensate is collected in a receiver C and as the oil is not miscible with the condensed water or steam, separation takes place, the water discharging through the pipe 5 and the oil is drained off through a valve 6.

In actual practice, it has been found that the hop oil is slightly soluble in water and for this reason the condensed water is saved for further use as will hereinafter be described. The distilling operation takes place at a temperature of approximately 250 to 260° F., and is usually completed within a period of thirty minutes. After the volatile constituents have been completely removed and collected, the first step of the process is completed and the hops are ready for the second step or treatment. This consists in adding one hundred barrels of water containing the condensate from pipe 5 and dissolving therein 350 pounds of malt syrup or other sugar solution. After this solution, which may be termed a sugar solution or solvent has been added, the steam is turned on in the heating coil 3 and the entire contents is raised to a boiling temperature and boiled for a period of approximately forty-five minutes. During the boiling operation all the hop extracts, to wit: the bitter resins, tannins, coloring matter, foam producing constituents, and other soluble constituents are dissolved and taken up by the solution and the solution is removed by draining through the perforated bottom and discharge valve and transferred to the vacuum pan through a pipe 7, a valve being introduced in this conduit to control the flow. The perforated bottom acts as a strainer and a comparatively clear solution is thus obtained in the vacuum pan.

In view of the fact that a considerable quantity of the liberated hop extracts adhere to the hop pulp, it is desirable to wash the pulp, this being accomplished by adding 40 barrels of hot water. This water passing through the hop pulp releases the remaining adhering extract and it is drained off through the pipe 7 and added to the extract previously removed. This completes the second step of the method. The third step is merely one of concentration. That is, the solution contained in the vacuum pan is subjected to a vacuum of from 21 to 24 inches and the water thus removed by evaporation. The solution is heated to the boiling point of the vacuum by a coil such as illustrated or in any other suitable manner and evaporation and concentration is carried on to a syrupy consistency. At this point the volatile oil, previously removed from the hops, is introduced and mixed with the hop extracts in the following manner:

A pipe 8 is connected with the bottom of the vacuum pan and the oil is introduced through this pipe, that is, it is drawn in through the concentrated extract by the vacuum action of the pan. In this manner a thorough mixing or co-mingling of the extract and oil takes place. It is further allowed to boil for a period of one or two minutes, thus further insuring a homogeneous mixture. At this time the product is completed and it may be withdrawn and hermetically sealed in tins or any other suitable receptacle for shipment to the market or otherwise. In some instances a dry product is desired. If that is the case, the concentrated extract is removed from the vacuum pan and dried, preferably in a vacuum. The dried material is then granulated or powdered in any suitable manner and the hop oil is finally added thereto. The dry material containing the hop oil may then be packed in hermetically sealed cans or it may be briquetted and coated with an air excluding medium such as gelatin or the like.

The products obtained may be used in any way for the manufacture of non-prohibited cereal beverages and other non-prohibited products.

Advantages

1. It reduces the labor costs of cereal beverage manufacture as it eliminates the handling of bulky hops and also straining or filtering operations.

2. It reduces the loss of hop oils in ordinary cereal beverage manufacture, because of the fact that the hop extract is not subjected to long continued boiling operations as when hops are employed which causes excessive volatilization of the oils.

3. It imparts to the finished product the aroma of the hops as well as the taste of the hops, thereby producing a more palatable beverage as well as greatly increasing the foaming properties of the beverage.

4. By using the sugar solution a larger quantity of bitter resins are extracted from the hops.

5. Hops, as ordinarily employed, are stored in bales and as such deteriorate rapidly. They deteriorate by loss of oil and a change in the resins from the soft bitter to the hard resins which are insoluble, while the treatment by the present method and reduction thereof to a concentrated extract permits the extract to be maintained in hermetically sealed containers and as such can be protected against deterioration, practically speaking, for an indefinite period.

6. A great reduction in bulk and weight reduces shipping, transportation and storage costs, etc.

Having thus described my invention, what I claim and desire to secure by Letters Patent is:—

1. A method of preparing hop extract for the manufacture of non-prohibited cereal beverages and other non-prohibited products, which comprises first subjecting hops to a distilling operation to drive off the volatile oils, second, condensing the volatile constituents and recovering the oil, third, boiling the remaining hop pulp in a sugar solution to extract the bitter constituents of the hops, the tannins, the coloring matter and foam producing consituents, fourth, removing the solution after the extraction of the bitter constituents, and fifth, concentrating the solution to obtain a syrupy consistency and mixing the solution and bitter constituents with the hop oil.

2. A method of preparing hop extract for the manufacture of non-prohibited cereal beverages and other non-prohibited products, which comprises first placing hops in a retort and passing steam through the hops and the retort to drive off the volatile oils, second, condensing the volatile constituents and recovering the oil, third, dissolving malt syrup in water and adding the solution to the hops, fourth, subjecting the solution of the hops to a boiling action to extract the bitter constituents of the hops, the tannins, the coloring matter and foam producing constituents, fifth, removing the solution after the extraction of the bitter constituents, sixth, placing the solution in a vacuum pan and subjecting the solution to a concentrating action until a syrupy-like consistency is obtained, and seventh, adding the hop oil formerly recovered to the concentrated solution and thoroughly mixing the same.

3. A product for the manufacture of non-prohibited cereal beverages and other non-prohibited products comprising a mixture of hop oil, hop bitters, tannin, coloring matter, foam producing constituents and malt syrup.

4. In a method of preparing hop extract for the manufacture of non-prohibited cereal beverages and other non-prohibited products, that step which comprises boiling the hops in a solution of water condensation containing hop oil and malt syrup to extract the bitter constituents of the hops.

5. The product for the manufacture of non-prohibited cereal beverages and other non-prohibited products, resulting from the method of claim 1 and comprising a mixture of hop oil, hop bitters, tannin, coloring matter, foam producing constituents and malt syrup.

EMIL C. HORST.